United States Patent
Hsu et al.

(10) Patent No.: US 12,228,757 B2
(45) Date of Patent: *Feb. 18, 2025

(54) COLOR FILTER ARRAY PATTERNS FOR ENHANCING A LOW-LIGHT SENSITIVITY WHILE PRESERVING A COLOR ACCURACY IN IMAGE SIGNAL PROCESSING APPLICATIONS

(71) Applicant: GM Cruise Holdings LLC, San Francisco, CA (US)

(72) Inventors: Ming-Hsuan Hsu, Milpitas, CA (US); Boyang Zhang, San Mateo, CA (US); Shane McGuire, Redwood City, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/131,028

(22) Filed: Apr. 5, 2023

(65) Prior Publication Data

US 2023/0258850 A1 Aug. 17, 2023

Related U.S. Application Data

(63) Continuation of application No. 16/569,863, filed on Sep. 13, 2019, now Pat. No. 11,650,360.

(51) Int. Cl.
*G02B 5/20* (2006.01)
*B60Q 1/00* (2006.01)

(52) U.S. Cl.
CPC ........... *G02B 5/201* (2013.01); *B60Q 1/0023* (2013.01)

(58) Field of Classification Search
None
See application file for complete search history.

(56) References Cited

U.S. PATENT DOCUMENTS

| 9,654,756 B1 | 5/2017 | Richards et al. |
| 2006/0146064 A1 | 7/2006 | Schweng et al. |

(Continued)

FOREIGN PATENT DOCUMENTS

EP 1679907 A1 7/2006

OTHER PUBLICATIONS

International Search Report and Written Opinion for International Application No. PCT/US2019/068320, mailed May 29, 2020, 13 pages.

*Primary Examiner* — Yingchun He
(74) *Attorney, Agent, or Firm* — Michael DiCato

(57) ABSTRACT

Color filter array patterns are provided for enhancing an image sensor's light sensitivity while preserving a color accuracy for image signal processing applications. In one example, an image sensor can include a substrate layer containing a first set of photodiodes and a second set of photodiodes, wherein each of the first set of photodiodes is larger than each of the second set of photodiodes; a first color filter array (CFA) covering the first set of photodiodes, wherein the first CFA includes a first set of color filters and a portion of the first set of color filters includes one or more clear filters; a second CFA covering the second set of photodiodes, wherein the second CFA includes a second set of color filters that is different than the first set of color filters; and one or more lenses covering the first CFA and the second CFA.

20 Claims, 8 Drawing Sheets

(56) References Cited

U.S. PATENT DOCUMENTS

| | | |
|---|---|---|
| 2007/0153104 A1 | 7/2007 | Ellis-Monaghan et al. |
| 2008/0043125 A1 | 2/2008 | Kozlowski |
| 2011/0140182 A1 | 6/2011 | Tanaka |
| 2012/0281111 A1 | 11/2012 | Jo et al. |
| 2015/0156412 A1 | 6/2015 | Kuang et al. |
| 2015/0237273 A1 | 8/2015 | Sawadaishi |
| 2017/0287981 A1* | 10/2017 | Han ........................ H10K 39/32 |
| 2017/0373105 A1 | 12/2017 | Galor Gluskin |
| 2018/0007324 A1 | 1/2018 | Chen et al. |
| 2018/0048801 A1 | 2/2018 | Kiser et al. |
| 2019/0041559 A1 | 2/2019 | Higashitani et al. |
| 2019/0067346 A1 | 2/2019 | Borthakur |
| 2019/0273879 A1 | 9/2019 | Xu et al. |
| 2022/0038648 A1 | 2/2022 | Iida et al. |

* cited by examiner

COLOR FILTER ARRAY PATTERNS FOR ENHANCING A LOW-LIGHT SENSITIVITY WHILE PRESERVING A COLOR ACCURACY IN IMAGE SIGNAL PROCESSING APPLICATIONS

CROSS-REFERENCE TO RELATED APPLICATIONS

This application claims the benefit of priority under of U.S. application Ser. No. 16/569,863, filed on Sep. 13, 2019, entitled, COLOR FILTER ARRAY PATTERNS FOR ENHANCING A LOW-LIGHT SENSITIVITY WHILE PRESERVING A COLOR ACCURACY IN IMAGE SIGNAL PROCESSING APPLICATIONS, which are hereby expressly incorporated herein by reference in their entireties.

TECHNICAL FIELD

The present disclosure generally relates to color filter array patterns for image signal processing and, more specifically, color filter array patterns for image signal processing.

BACKGROUND

The sensitivity of an image sensor on a camera device depends on the quantum efficiency (QE) of the image sensor, the conversion gain (CG) of the image sensor, and the pixel size. The QE is the fraction of photon flux that contributes to the photocurrent in a photodetector or pixel. The QE provides the quality of the light or charge transformation in the image sensor, while the CG describes the image sensor's ability to convert the electrons generated into voltage. Thus, a higher QE can result in a higher sensitivity of an image sensor. To this end, color filter arrays (CFAs) are often implemented in image sensor devices to sense colors. The CFA can affect the QE and sensitivity of the image sensor largely depending on the materials and color pattern arrangement of the CFA.

A CFA is a mosaic of color filters placed over pixel/photodiode of an image sensor to capture color information. Unfortunately, while CFAs can improve the QE and sensitivity of an image sensor, current CFA technologies can often have a negative impact on the color separation properties of the image sensor. This drawback can create significant challenges in a variety of image signal processing tasks and applications. For example, in autonomous vehicle applications, which generally implement image sensor to help with various operations such as navigation, such diminished color separation properties can make red, green and yellow traffic light captured by an image sensor more difficult to separate. As a result, current CFA technologies can reduce an autonomous vehicle's ability to recognize different traffic lights and navigate without a human driver.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
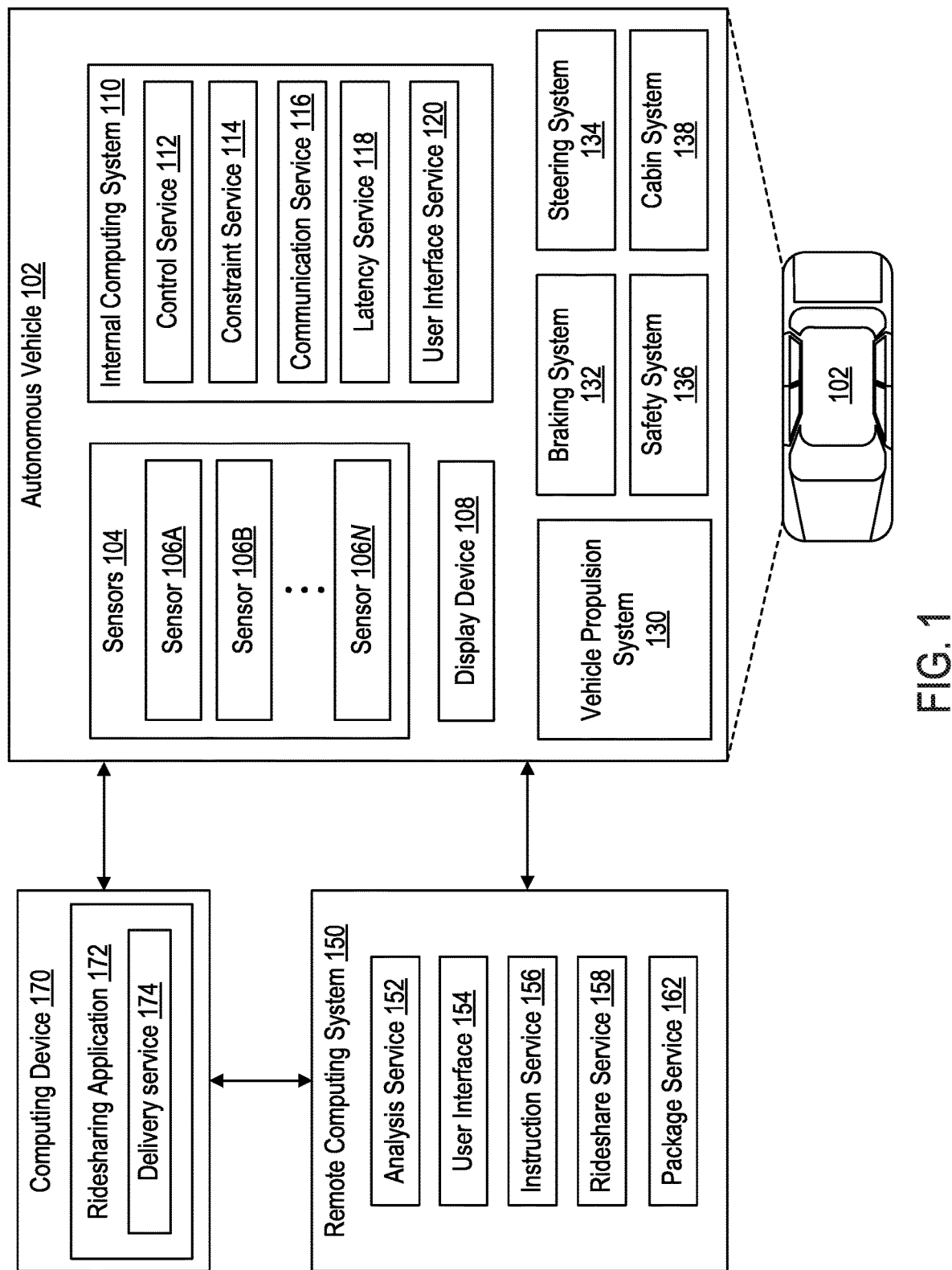
FIG. 1 illustrates an example autonomous vehicle environment including a computing system in communication with an autonomous vehicle, in accordance with some examples.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for enhancing the low light sensitivity of image sensors while preserving the color accuracy of image data for image signal processing. In some aspects, different color filter arrays (CFAs) can be implemented for small and large photodiodes in an image sensor to increase the quantum efficiency (QE) of the image sensor and thereby enhancing the low light sensitivity of the image sensor, while preserving or improving color separation and fidelity.

For example, to achieve high dynamic range (HDR), an image sensor can implement a split-pixel or sub-pixel design where two physical photodiodes, a large and a small photodiode, are associated with each pixel readout circuitry. To enhance the low light sensitivity of the image sensor while preserving or improving color separation qualities, a specific CFA that can enhance low light sensitivity can be implemented for the large photodiodes and a different CFA that can preserve or enhance color separation capabilities can be implemented for the small photodiodes.

To illustrate, in some examples, an RCCB (Red, Clear, Clear, Blue or 25% Red, 50% Clear, and 25% Blue) CFA can be used for the large photodiodes and an RGGB (Red, Green, Green, Blue or 25% Red, 50% Green, and 25% Blue) CFA can be used for the small photodiodes. Here, the clear portion of the RCCB CFA can increase the low light sensitivity of the large photodiodes while the RGGB CFA can preserve or enhance the color separation qualities of the small photodiodes. In addition, the combination of large photodiodes with higher light sensitivity and the small photodiodes with the lower light sensitivity can enable high dynamic range.

These approaches can be implemented in a variety of image processing applications and use cases. In some illustrative cases, the different CFAs used for the small and large photodiodes in an image sensor as described herein can be implemented in autonomous vehicle (AV) applications to enhance the low light sensitivity of the image sensor while preserving or improving color separation and fidelity to improve the image sensors ability to detect and accurately recognize different traffic lights and other lights in an AV environment. For example, in such implementations, traffic lights with a high signal intensity can be captured by the small photodiodes with a first type of CFA which can allow for better or accurate color separation and accuracy. For low signal intensity areas or regions, the large photodiodes with the second type of CFA containing a clear filter can provide low light sensitivity. The combination can thus provide high sensitivity with high color separation and accuracy.

FIG. 1 illustrates an example autonomous vehicle environment 100, in which the technologies herein can be implemented. The example autonomous vehicle environment 100 includes an autonomous vehicle 102, a remote computing system 150, and a ridesharing application 172 on a computing device 170. The autonomous vehicle 102, remote computing system 150, computing device 170 (including ridesharing application 172) can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104 on the autonomous vehicle 102. The sensors 104 on the autonomous vehicle 102 can include one or more types of sensors and can be arranged about the autonomous vehicle 102. For example, the sensors 104 can include, without limitation, one or more: inertial measuring units (IMUs), image sensors (e.g., visible light image sensors, infrared image sensors, video camera sensors, etc.), light emitting sensors (e.g., lasers, light detection and ranging sensors (LIDARs), etc.), global positioning system (GPS) devices, radars, sonars, accelerometers, gyroscopes, magnetometers, motion detection sensors, light detectors, audio sensors (e.g., microphones), seat occupancy sensors, ultrasonic sensors, position sensors, steering angle sensors, steering wheel rotation sensors, speedometers, proximity sensors, etc.

In some implementations, the sensors 104 can include one or more image sensors 106A (e.g., camera sensors, visible light sensors, infrared light sensors, HDR image sensors, etc.), one or more radars sensors 106B, and one or more LIDAR sensors 106N. Other implementations can include any other number and types of sensors.

The autonomous vehicle 102 can include one or more display devices 108 for presenting information, such as maps, messages, and interfaces, to passengers in the autonomous vehicle 102. The one or more display devices 108 can be mounted on one or more locations in the autonomous vehicle 102. For example, the one or more display devices 108 can be mounted on one or more seats or headrests in the autonomous vehicle 102, a dashboard in the autonomous vehicle 102, one or more inner sides or door panels on the autonomous vehicle 102, a roof of the autonomous vehicle 102, and/or any other interior location of the autonomous vehicle 102. The one or more display devices 108 can include, for example and without limitation, a screen, a television, a projecting device, and/or any other suitable display device for rendering graphical information.

Moreover, the autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, display devices, light-emitting devices, audio systems, etc.

The autonomous vehicle 102 can include an internal computing system 110 in communication with the sensors 104, the display device(s) 108, and the systems 130, 132, 134, 136, and 138. The internal computing system 110 can include one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by the sensors 104 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface system that provides cellular (long-term evolution (LTE), $3^{rd}$ Generation (3G), $5^{th}$ Generation (5G), etc.) communication, Bluetooth communication, near-field communication, and/or any other suitable type of wireless communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to, or receive an instruction from, the autonomous vehicle 102 regarding destinations, requested routes, drop-off locations, wayfinding tasks, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 172 operating on computing device 170. Computing device 170 can include, for example and without limitation, a tablet computer, a laptop computer, a smartphone, a head-mounted display (HMD), a gaming system, a server, a smart device, a laptop computer, a smart wearable (e.g., smart glasses, smart watch, etc.), a mobile computing device, and/or any other computing device. In some cases, the computing device 170 can be a mobile computing device of a user or passenger/rider. Moreover, in some cases, the remote computing system 150 and the autonomous vehicle 102 can also communicate and interact with other computing devices hosting instances of the ridesharing application 172 and the delivery service 174. For example, the remote computing system 150 and the autonomous vehicle 102 can also communicate and interact with other computing devices associated with one or more passengers.

The rideshare service 158 can receive requests from passenger ridesharing application 172, such as user requests to be picked up or dropped off, and can dispatch autonomous vehicle 102 for a requested trip. The rideshare service 158 can also act as an intermediary between the ridesharing application 172 and the autonomous vehicle 102. For example, rideshare service 158 can receive from a passenger instructions for the autonomous vehicle 102, such as instructions to go around an obstacle, change routes, select a drop-off location and/or pick-up location, etc. The rideshare service 158 can provide such instructions to the autonomous vehicle 102 as requested.

The remote computing system 150 can also include a package service 162 configured to interact with the computing device 170, the ridesharing application 172 and/or a delivery service 174 of the ridesharing application 172. A user operating the ridesharing application 172 can interact with the delivery service 174 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 174 to provide a package identifier to the user for package labeling and tracking. Package delivery service 174 can also inform a user of where to bring their labeled package for drop off. In some examples, a user can request the autonomous vehicle 102 come to a specific location, such as the user's location, to pick up the package. While delivery service 174 has been shown as part of the ridesharing application 172, it will be appreciated by those of ordinary skill in the art that delivery service 174 can be its own separate application.

One example beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2:
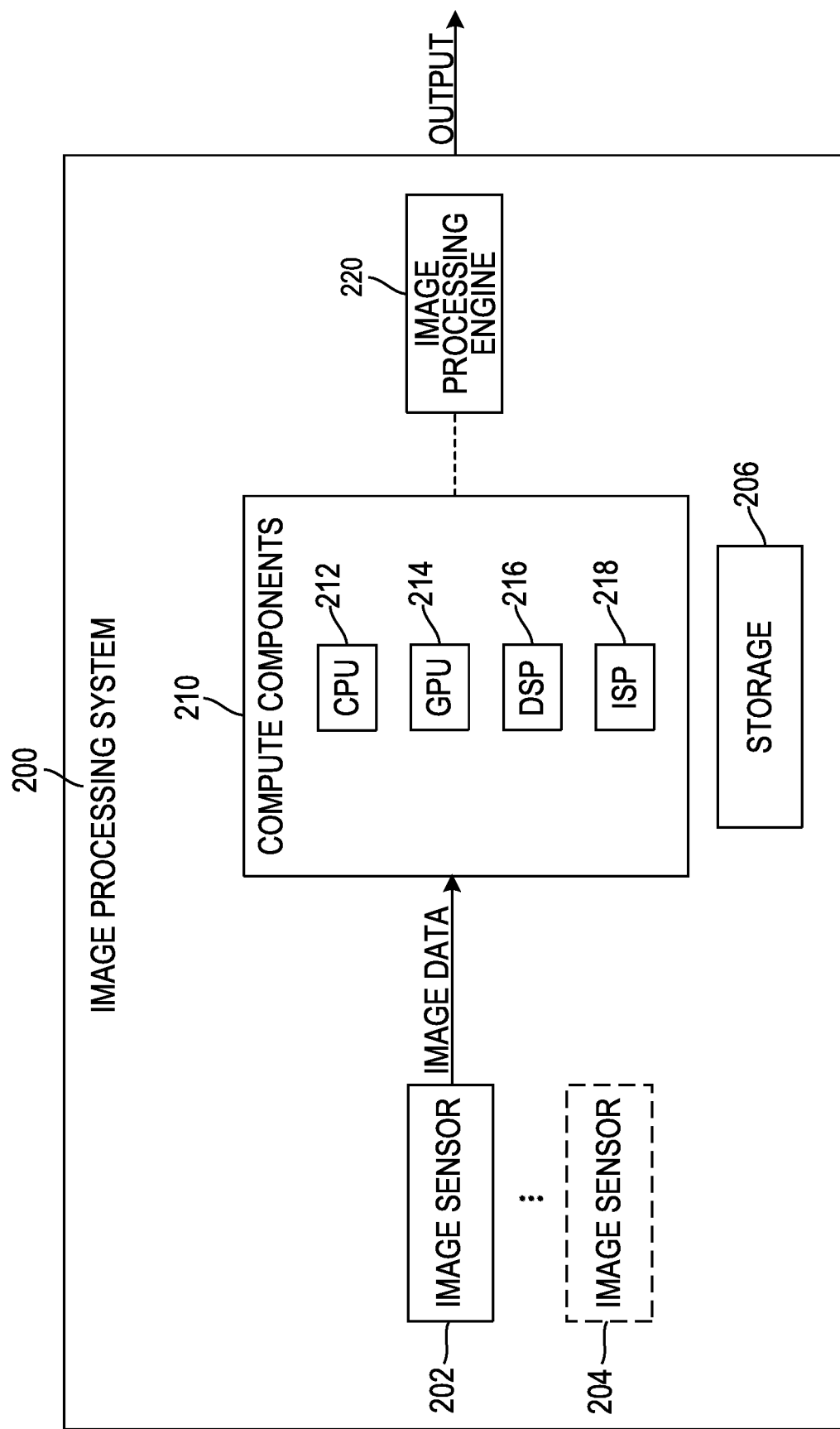
FIG. 2 illustrates an example image processing system, in accordance with some examples.

FIG. 2 is a diagram illustrating an example image processing system 200. The image processing system 200 can perform various image processing tasks and generate image data (e.g., images, videos, etc.) as described herein. In this example, the image processing system 200 can include an image sensor 106A, a storage 205, compute components 210, and an image processing engine 220. The image processing system 200 can also optionally include one or more other sensors 104, such as another image sensor 106B, a light detection and ranging (LIDAR) sensing device, an IMU, etc. For example, in dual camera or image sensor applications, the image processing system 200 can include front and rear image sensors (e.g., 106A, 106B).

The image processing system 200 can be part of a computing device or multiple computing devices. In some examples, the image processing system 200 can be part of an electronic device (or devices) such as a camera system (e.g., a digital camera, an IP camera, a video camera, a security camera, etc.), a laptop or notebook computer, a tablet computer, a smart television, a display device, a digital media player, a video streaming device, internal computing system 110, an IoT (Internet-of-Things) device, a server, or any other suitable electronic device(s).

In some implementations, the image sensor 106A, the image sensor 106B, the storage 205, the compute components 210, and the image processing engine 220 can be part of the same computing device. For example, in some cases, the image sensor 106A, the image sensor 106B, the storage 205, the compute components 210, and the image processing engine 220 can be integrated into a camera system, a computer system (e.g., 110), a smartphone, and/or any other computing device. However, in some implementations, the image sensor 106A, the image sensor 106B, the storage 205, the compute components 210, and/or the image processing engine 220 can be part of two or more separate computing devices.

The image sensors 106A and 106B can be any image and/or video sensors or capturing devices, such as a digital camera sensor, a video camera sensor, an image/video capture device on an electronic apparatus such as a computer, a camera system, etc. In some cases, the image sensors 106A and 106B can be part of a camera or computing device such as a digital camera, a video camera, an IP camera, a computing system, etc. In some examples, the image sensors 106A and 106B can be used to capture image data from an exterior of autonomous vehicle 102. In some examples, the image sensors 106A and 106B can be part of a dual-camera assembly. The image sensors 106A and 106B can capture image and/or video content (e.g., raw image and/or video data), which can then be processed by the compute components 210 and image processing engine 220 as described herein.

The storage 205 can be any storage device(s) for storing data, such as image or video data for example. Moreover, the storage 205 can store data from any of the components of the image processing system 200. For example, the storage 205 can store data from any of the sensors 106A and/or 106B, data from the compute components 210 (e.g., processing parameters, output images, calculation results, etc.), and/or data from the image processing engine 220 (e.g., output images/videos, processing results, etc.). In some examples, the storage 205 can include a buffer for storing data (e.g., image data) for processing by the compute components 210.

In some implementations, the compute components 210 can include a central processing unit (CPU) 212, a graphics processing unit (GPU) 214, a digital signal processor (DSP) 216, and an image signal processor (ISP) 218. The compute components 210 can perform various operations such as image enhancement, object or image segmentation, computer vision, graphics rendering, augmented reality, image/video processing, sensor processing, recognition (e.g., object recognition, feature recognition, tracking or pattern recognition, scene change recognition, etc.), disparity detection, machine learning, filtering, image denoising, image demosaicing, auto white balance, color transforms, tone reproduction, lens shading correction, color interpolation, image scaling, colorspace conversion, and/or any other image processing operations. In some examples, the compute components 210 can implement the image processing engine 220. In other examples, the compute components 210 can also implement one or more other processing engines.

The operations for the image processing engine 220 can be implemented by one or more of the compute components 210. In one illustrative example, the image processing engine 220 can be implemented by the CPU 212, the DSP 216, and/or the ISP 218, and the GPU 214 can implement operations for rendering image data from the image processing engine 220. In some cases, the compute components 210 can include other electronic circuits or hardware, computer software, firmware, or any combination thereof, to perform any of the various operations described herein.

In some cases, the compute components 210 can receive data (e.g., image/video data, etc.) captured by the image sensor 106A and process the data (e.g., via image processing engine 220) to generate output images or frames as described herein. For example, the compute components 210 can process an image signal captured using large photodiodes and a first type of CFA implemented by the image sensor 106A and an image signal captured using small photodiodes and a second type of CFA implemented by the image sensor 106A, interpolate color channels or information from the image signals, process the interpolated image data and generate an output image. In some examples, an image or frame can be a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture.

The compute components 210 can implement the image processing engine 220 to perform various image processing operations and generate an output image as described herein. For example, the compute components 210 can implement the image processing engine 220 to perform lens shading correction, feature detection, blurring, segmentation, filtering, color correction, noise reduction, scaling, ranking, demosaicing, color interpolation, image signal processing, image enhancement, etc. The compute components 210 can process image data captured by the image sensors 106A and/or 106B; image data in storage 205; image data received from a remote source, such as a remote camera, a server or a content provider; image data obtained from a combination of sources; etc.

While the image processing system 200 is shown to include certain components, one of ordinary skill will appreciate that the image processing system 200 can include more or fewer components than those shown in FIG. 2. For example, the image processing system 200 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 2. An illustrative example of a computing device and hardware components that can be implemented with the image processing system 200 is described below with respect to FIG. 7.

Figure 3:
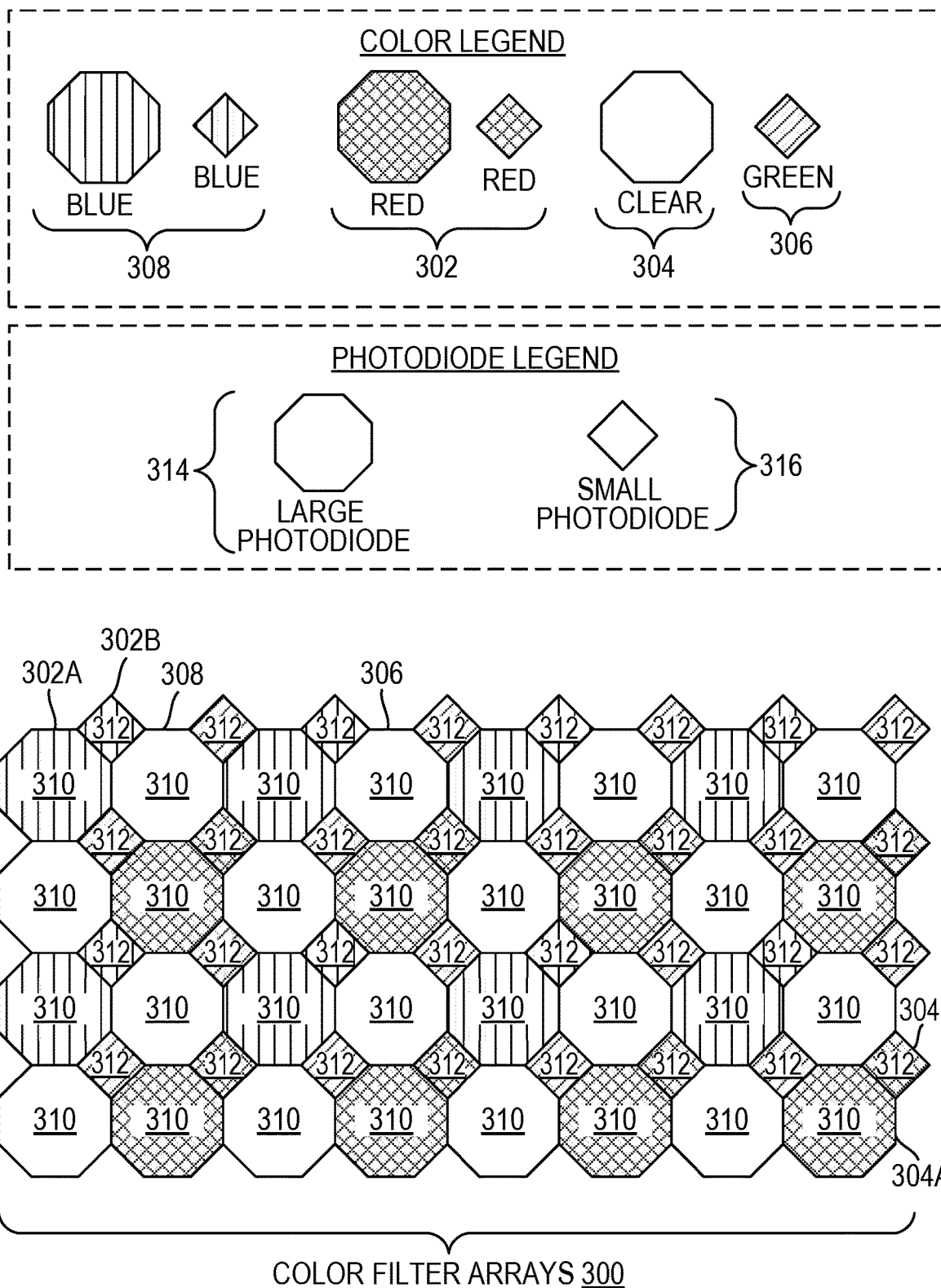
FIG. 3 illustrates an example configuration of an image sensor with different color filter arrays for larger photodiodes and smaller photodiodes in the image sensor, in accordance with some examples.

FIG. 3 illustrates an example configuration of an image sensor (e.g., 106A) with different color filter arrays (CFAs) 300 for larger photodiodes 314 and smaller photodiodes 316 in the image sensor (e.g., 106A). Each of the color filter arrays 300 can include respective color filters 302, 304, 306, 308, and each color filter 302, 304, 306, 308 can be configured to respectively cover (e.g., can be applied to, above, or over) a larger photodiode 314 or a smaller photodiode 316. Moreover, the color filters 302, 306, 308 can each have a specific spectral sensitivity function, and can filter light by a specific wavelength range such that the separate filtered intensities include information about the color of light.

The color filters 302, 304, 306, 308 can include, for example, a red (R) filter 302, a clear (C) filter 304, a green (G) filter 306, and a blue (B) filter 308. The clear filter 304 can be a white or transparent filter that does not filter any light or filters a very little amount of light, thus allowing a greater amount of light through than the other color filters 302, 306, and 308 and providing a higher pixel sensitivity.

The color filter arrays 300 can include CFA 310 which can be configured to cover the large photodiodes 314, and CFA 312 which can be configured to cover the small photodiodes 316. The CFA 310 and the CFA 312 can be different color filter arrays with different color patterns and/or mosaics. The different color filter arrays with different color patterns and/or mosaics can result in different spectral sensitivities and color separation properties.

For example, the CFA 310 covering the larger photodiodes 314 can be designed to increase the low light sensitivity of the larger photodiodes 314. The larger surface area or aperture of the larger photodiodes 314 can allow the larger photodiodes 314 to collect a greater amount of light which, in combination with the increased low light sensitivity provided by the CFA 310, can produce high spectral sensitivity and fidelity. Moreover, the CFA 312 covering the smaller photodiodes 316 can be designed to give information about the intensity of light in different color or wavelength regions (e.g., filter different light intensities) and provide higher color separation properties. Together, the CFA 310 and the CFA 312 implemented in a split-pixel or sub-pixel configuration (e.g., a configuration of larger photodiodes 314 and smaller photodiodes 316) can thus provide enhanced low light sensitivity and color separation properties, as well as high dynamic range (HDR) imaging capabilities.

In FIG. 3, the CFA 310 includes red filters 302, clear filters 304, and blue filters 308 in an RCCB configuration (e.g., 25% Red, 50% Clear, and 25% Blue). However, this example configuration is merely a non-limiting example provided for explanation purposes. One of skill in the art will recognize that, in other cases, the CFA 310 can include other configurations such as, for example, an RGBC (Red, Green, Blue, Clear) pattern, an RCBE (Red, Clear, Blue, Emerald) pattern, an RCYB (Red, Clear, Yellow, Blue) pattern, an RCCC (Red, Clear, Clear, Clear) pattern, etc.

Moreover, in this example, the CFA 312 includes red filters 302, green filters 306, and blue filters 308 in an RGGB configuration (e.g., 25% Red, 50% Green, and 25% Blue). However, this example configuration is merely a non-limiting example provided for explanation purposes. One of skill in the art will recognize that, in other cases, the CFA 312 can include other configurations such as, for example, an RCGB (Red, Clear, Green, Blue) pattern, an RGBE (Red, Green, Blue, Emerald) pattern, an RYYB (Red, Yellow, Yellow, Blue) pattern, etc.

In some examples, the CFA 310 and/or the CFA 312 can be patterned to include a clear filter 304 to allow more light to be detected and provide higher spectral sensitivity. For example, one of the CFAs (310 or 312) can include clear filters 304 to provide higher spectral sensitivity, while the other CFA (310 or 312) can include a different configuration of filters that provides better color separation properties. The combination of the different CFAs 310 and 312 can thus enhance the sensitivity of the image sensor (e.g., 106A), while also providing high or accurate color separation and fidelity.

Figure 4A:
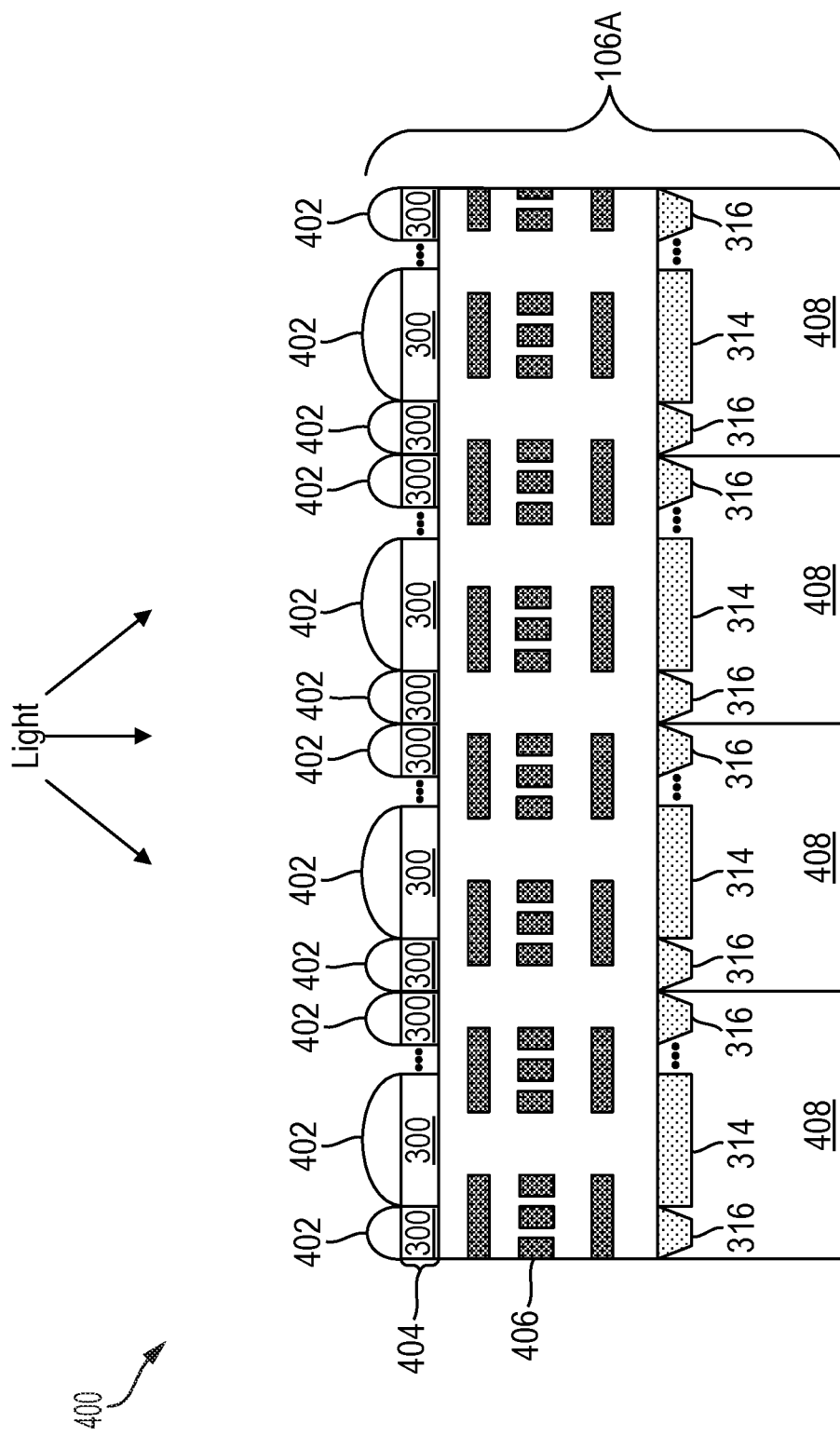
FIG. 4A illustrates an example configuration of a frontside-illuminated image sensor implementing different color filter arrays, in accordance with some examples.

FIG. 4A illustrates an example configuration 400 of a frontside-illuminated image sensor 106A implementing the CFAs 300 shown in FIG. 3. In this example configuration 400, the image sensor 106A can include a substrate region 408 containing photodiodes 314 and 316 configured to convert collected light into an electrical current. The substrate region 408 can include a substrate such as, for example and without limitation, silicon, germanium, silicon-germanium, a semiconductor compound, etc. Moreover, the photodiodes 314 and 316 can include larger photodiodes (314) and smaller photodiodes (316) in a split-pixel or sub-pixel configuration.

A wiring layer 406 can be positioned on or disposed over (e.g., on the top surface) the substrate region 408. The wiring layer 406 can provide a passage to allow light collected by microlenses 402 on the image sensor 106A to reach the photodiodes 314 and 316. In some examples, the wiring layer 406 can include transistors and wires connected to the transistors. Moreover, in some examples, the wiring layer 406 can include conductive layers such as, for example and without limitation, metal and/or polysilicon layers.

A color filter array (CFA) layer 404 can be positioned on or disposed over (e.g., on the top surface) the wiring layer 406 and under the microlenses 402. The CFA layer 404 can include CFAs 300 containing different color filters (e.g., 302A, 302B, 304A, 304B, 306, 308) that selectively allow different, respective colors of light to pass through to the photodiodes 314 and 316. As previously mentioned, at least one of the different color filters can include a clear filter which can allow light of all the color wavelengths to pass through.

In some examples, the CFAs 300 in the CFA layer 404 can include a CFA (e.g., 310) corresponding to the larger photodiodes 314 and a CFA (e.g., 312) corresponding to the smaller photodiodes 316. The CFA corresponding to the larger photodiodes 314 can cover or overlap over the larger photodiodes 314. The color filters in this CFA can filter specific colors of light and help focus the filtered light to corresponding ones of the larger photodiodes 314 (e.g., respective photodiodes covered or overlapped by corresponding color filters). Moreover, any clear filters in the CFA can allow light of all the color wavelengths to pass through to corresponding ones of the larger photodiodes 314.

The CFA corresponding to the smaller photodiodes 316 can cover or overlap over the smaller photodiodes 316. The color filters in this CFA can similarly filter specific colors of light and help focus the filtered light to corresponding ones of the smaller photodiodes 316 (e.g., respective photodiodes covered or overlapped by corresponding color filters). Moreover, any clear filters in the CFA can allow light of all the color wavelengths to pass through to corresponding ones of the larger photodiodes 316.

As previously noted, the CFA layer 404 can be disposed under the microlenses 402. In some cases, each microlens 402 can be disposed over a respective color filter from the CFAs 300 in the CFA layer 404. The microlenses 402 can help the photodiodes 314 and 316 in the image sensor 106A collect more light. For example, the microlenses 402 can help focus incident light onto the photodiodes 314 and 316. The microlenses 402 can focus incoming light to the photodiodes 314 and 316. The incoming light can pass through the CFA layer 404 and the wiring layer 406, onto respective photodiodes 314 and 316.

Figure 4B:
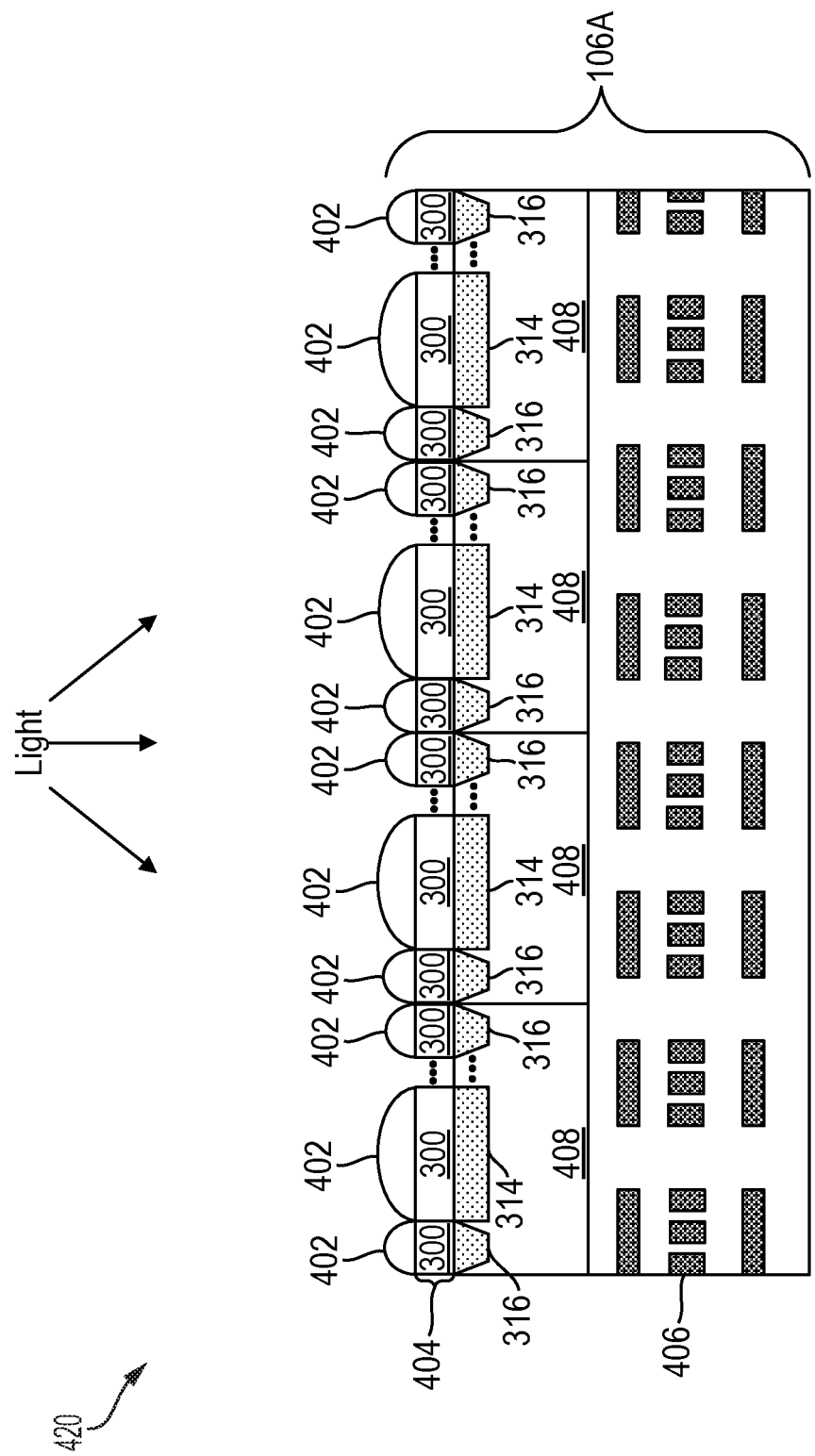
FIG. 4B illustrates an example configuration of a backside-illuminated image sensor implementing different color filter arrays, in accordance with some examples.

With reference to FIG. 4B, which illustrates an example configuration 420 of a backside-illuminated image sensor 106A implementing the CFAs 300 shown in FIG. 3, in some cases the substrate region 408 containing the photodiodes 314 and 316 can instead be configured over the wiring layer 406 and under the CFA layer 404. Here, the CFA layer 404 can be disposed over the photodiodes 314 and 316, and light can pass through the microlenses 402 and CFA layer 404 onto the photodiodes 314 and 316 without first traveling through the wiring layer 406. The wiring layer 406 can be positioned under the substrate region 408, the CFA layer 404 and the microlenses 402.

Figure 5:
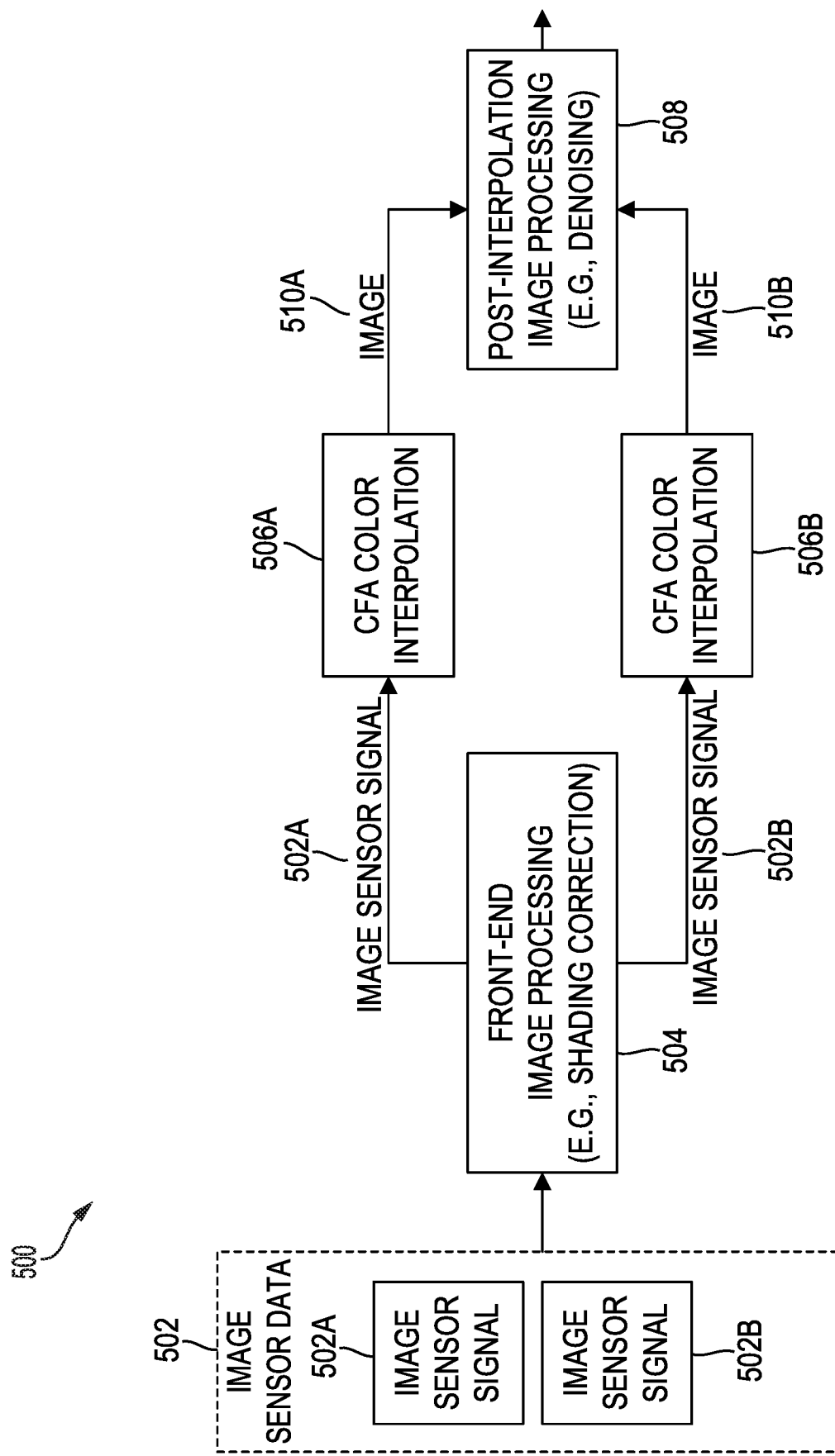
FIG. 5 illustrates an example flow for processing image data generated by larger photodiodes and smaller photodiodes on an image sensor based on light signals filtered by different color filter arrays corresponding to the larger photodiodes and the smaller photodiodes, in accordance with some examples.

FIG. 5 illustrates an example flow 500 for processing image data generated by the larger photodiodes 314 and the smaller photodiodes 316 based on light signals filtered by CFAs 300 including a CFA (e.g., 310) corresponding to the larger photodiodes 314 and a different CFA (e.g., 312) corresponding to the smaller photodiodes 316. In this example flow 500, the image processing system 200 can obtain image sensor data 502 and perform front-end image processing 504 on the image sensor data 502. The image processing system 200 can obtain the image sensor data 502 from an image sensor (e.g., 106A) configured with larger photodiodes 314 and smaller photodiodes 316, as well as different CFAs (e.g., 310, 312) respectively corresponding to the larger photodiodes 314 and the smaller photodiodes 316.

The image sensor data 502 can include an image sensor signal 502A generated from the larger photodiodes 314 based on light captured using a CFA (e.g., 310) corresponding to the larger photodiodes 314, and an image sensor signal 502B generated from the smaller photodiodes 316 based on light captured using a different CFA (e.g., 312) corresponding to the smaller photodiodes 316. The image processing system 200 can perform the front-end image processing 504 on the image sensor signals 502A and 502B and process the output signals through different image signal processing pipelines as described herein.

The front-end image processing 504 can involve one or more initial or front-end image processing operations. For example, in some cases, the front-end image processing 504 can include lens shading correction or vignetting performed on the image sensor signals 502A and 502B. In other examples, the front-end image processing 504 can include other or additional operations performed on the image sensor signals 502A and 502B, such as, for example, auto exposure, auto white balance, gain correction, dead pixel detection or correction, etc.

After the front-end image processing 504, the image processing system 200 can perform CFA color interpolation 506A (e.g., CFA demosaicing) on the image sensor signal 502A. The image processing system 200 can also (separately) perform CFA color interpolation 506B (e.g., CFA demosaicing) on the image sensor signal 502B. The CFA color interpolation 506A performed on the image sensor signal 502A can depend on the CFA implemented with the larger photodiodes 314 (e.g., the CFA applied to the light collected and processed by the larger photodiodes 314) that generated the image sensor signal 502A. For example, if the CFA implemented with the larger photodiodes 314 that generated the image sensor signal 502A is an RCCB (Red, Clear, Clear, Blue) CFA, the CFA color interpolation 506A can be an RCCB CFA color interpolation operation tailored for the RCCB CFA.

Similarly, the CFA color interpolation 506B performed on the image sensor signal 502B can depend on the CFA implemented with the smaller photodiodes 316 that generated the image sensor signal 502B. For example, if the CFA implemented with the smaller photodiodes 316 that generated the image sensor signal 502B is an RGGB (Red, Green, Green, Blue) CFA, the CFA color interpolation 506B can be an RGGB CFA color interpolation operation tailored for the RGGB CFA.

The goal of the CFA color interpolation 506A is to reconstruct a full color image based on the color channels/information in the image sensor signal 502A, and the goal of the CFA color interpolation 506B is to reconstruct a full color image based on the color channels/information in the image sensor signal 502B. In some cases, the CFA color interpolations 506A and 506B can each implement an algorithm that performs color interpolation based on spatial and/or spectral correlation of pixels within the image sensor signals 502A and 502B.

In some examples, the CFA color interpolations 506A and 506B can estimate color channel values based on the color channel values of neighboring color channels or pixels (e.g., bilinear interpolation, bi-cubic interpolation, etc.). For example, in some cases, the CFA color interpolation 506A can estimate a specific color channel based on a mean or average of the color channel values of a number of neighboring color channels in the image sensor signal 502A. In other examples, the CFA color interpolations 506A and 506B can estimate color channel values based on edge-aware interpolation.

When completed, the CFA color interpolation 506A can produce an image 510A created based on the interpolation of color information in the image sensor signal 502A. Similarly, when completed, the CFA color interpolation 506B can produce an image 510B created based on the interpolation of color information in the image sensor signal 502B. The image processing system 200 can then perform post-interpolation image processing 508 on the images 510A and 510B. In the post-interpolation image processing 508, the image processing system 200 can perform any of the operations in the image signal processing pipeline. For example, in the post-interpolation image processing 508, the image processing system 200 can perform denoising, downsampling, color transforms, tone reproduction, image scaling, image enhancement, color space conversion, compression, etc.

The output of the post-interpolation image processing 508 can include image data generated based on the image sensor signals 502A-B produced using the different CFAs (e.g., 300) and the photodiodes 314-316. In some examples, the image data can include the images 510A and/or 510B after the post-interpolation image processing 508. In other examples, the output of the post-interpolation image processing 508 can include image data (e.g., an image) generated based on the images 510A and 510B after the post-interpolation image processing 508. In yet other examples, the output of the post-interpolation image processing 508 can include image data including at least a portion of the image 510A and the image 510B after the post-interpolation image processing 508.

The output image data can be rendered on a display, stored on a storage device (e.g., 205), analyzed for certain image processing tasks (e.g., feature extraction, segmentation, object recognition, feature detection, etc.), sent to a separate or remote computing device, processed to generate one or more image effects, etc. In some examples, the output image data can be used by an autonomous vehicle 102 to help with self-driving or navigation operations. For example, the output image data can be used by an autonomous vehicle 102 to detect traffic light signals and/or other environment features (e.g., traffic signals, objects, lights, humans, animals, obstructions, other vehicles, landscape, structures, colors, etc.) captured by the image sensor 106A, which the autonomous vehicle 102 can use to help with self-driving or navigation operations.

Figure 6:
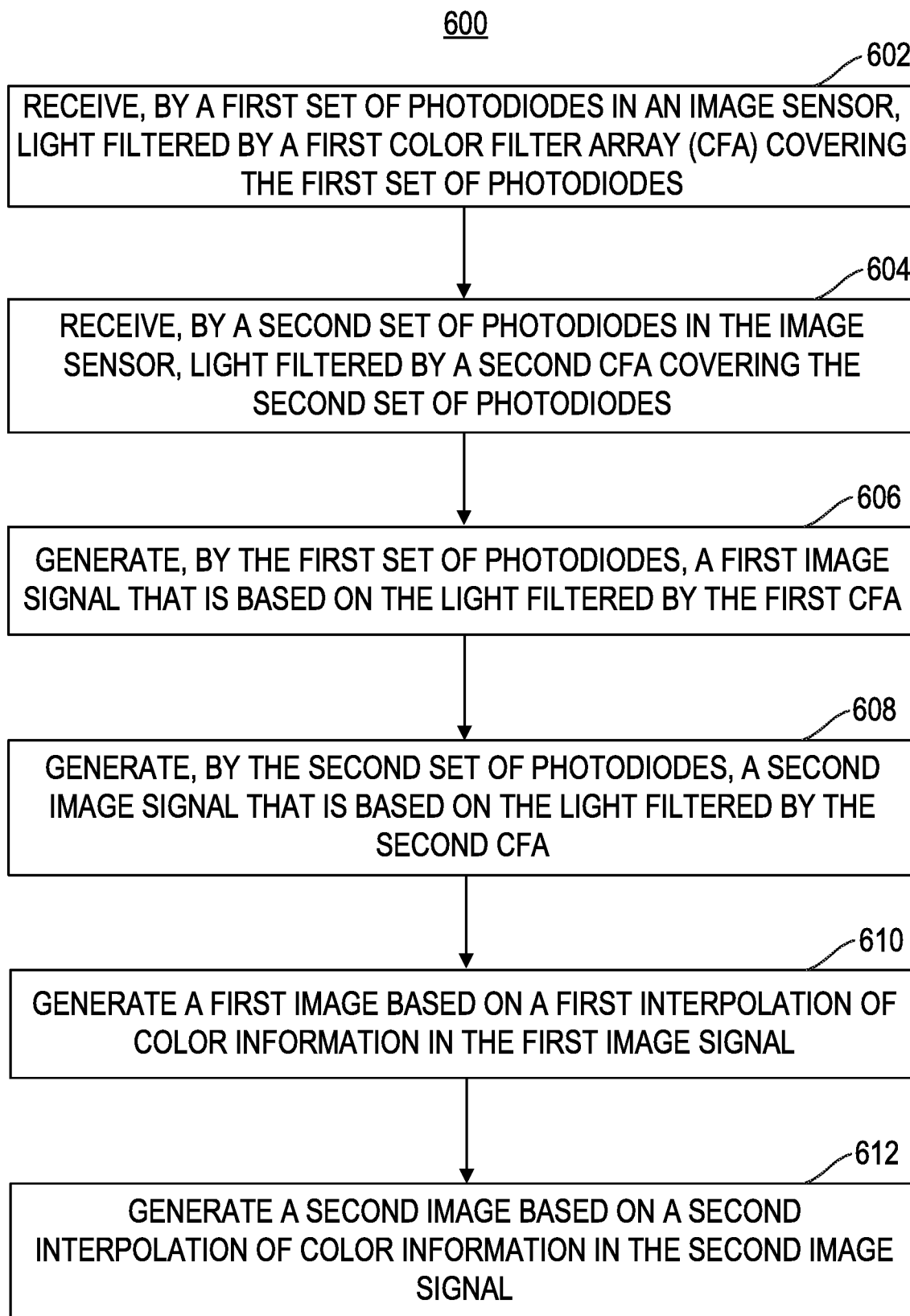
FIG. 6 illustrates an example method for implementing different color filter arrays on an image sensor to enhance the image sensor's light sensitivity while preserving or improving a color accuracy, in accordance with some examples.

Having disclosed some example system components and concepts, the disclosure now turns to FIG. 6, which illustrates an example method 600 for implementing different CFAs on an image sensor (106A) to enhance the image sensor's light sensitivity while preserving or improving color accuracy. The steps outlined herein are examples and can be implemented in any combination thereof, including combinations that exclude, add, or modify certain steps.

At step 602, the method 600 can include receiving, by a first set of photodiodes (314) in an image sensor (106A), light filtered by a first CFA (310) covering the first set of photodiodes (314). The first CFA (310) can include a first set of color filters (e.g., 302A, 304A, 306). In some examples, some of the first set of color filters can include clear filters (310). The clear filters (310) can capture different colors of light and/or allow different colors of light to pass without being filtered. In some implementations, the first CFA (310) can include an RCCB (Red, Clear, Clear, Blue) color filter pattern. In other implementations, the first CFA (310) can include other color filter patterns, as previously described.

In some examples, the image sensor (106A) can be a high dynamic range (HDR) image sensor in an HDR camera system. Moreover, in some examples, the image sensor (106A) can include microlenses (402) covering the first CFA (310) and the second CFA (312). The microlenses (402) can focus, or aim, any incoming light onto respective color filters in the first CFA (310) and the second CFA (312). The microlenses (402) can also focus, or aim, any incoming light onto respective photodiodes in the first set of photodiodes (314) and the second set of photodiodes (316).

At step 604, the method 600 can include receiving, by a second set of photodiodes (316) in the image sensor (106A), light filtered by a second CFA (312) covering the second set of photodiodes (316). The second CFA (312) can include a second set of color filters (e.g., 302B, 304B, 308). The second set of color filters in the second CFA (312) can be different than the first set of color filters in the first CFA (310). For example, the second set of color filters can include one or more color filters than the first set of color filters and/or can make up a different color filter pattern than the first set of color filters.

Moreover, each of the second set of photodiodes (316) can have a different size than each of the first set of photodiodes (314). For example, the photodiodes in the first set of photodiodes (314) can be larger than the photodiodes in the second set of photodiodes (316), or vice versa. The first set of photodiodes (314) and the second set of photodiodes (316) can thus have different aperture or surface area sizes. As a result, the first set of photodiodes (314) and the second set of photodiodes (316) can collect different amounts of light and can have different sensitivities.

The different CFAs (310, 312) can exploit these characteristics of the first and second set of photodiodes (314, 316) to optimize the image sensor's low light sensitivity, color fidelity, and color separation properties. For example, the different CFAs (310, 312) can exploit these characteristics of the first and second set of photodiodes (314, 316) by implementing a CFA that enhances light sensitivity on one of the sets of photodiodes, such as the set of larger photodiodes which have a higher sensitivity by virtue of their larger size, and implementing on the other set of photodiodes a different CFA that preserves or enhances color separation properties.

At step 606, the method 600 can include generating, by the first set of photodiodes (314), a first image signal (e.g., 502A) that is based on the light filtered by the first CFA (310). At step 608, the method 600 can include generating, by the second set of photodiodes (316), a second image signal (e.g., 502B) that is based on the light filtered by the second CFA (312).

At step 610, the method 600 can include generating a first image (e.g., 510A) based on a first interpolation (e.g., 506A) of color information in the first image signal (e.g., 502A). At step 612, the method 600 can also include generating a second image (e.g., 510B) based on a second interpolation (e.g., 506B) of color information in the second image signal (e.g., 502B).

In some cases, the method 600 can also include processing the first image (e.g., 510A) and the second image (e.g., 510B) through at least a portion of an image signal processing pipeline. The image signal processing pipeline can include one or more image processing operations such as, for example and without limitation, a denoising operation, a downsampling operation, a color transform, a tone reproduction operation, an image scaling operation, an image enhancement operation, a color space conversion operation, a compression operation, etc.

Moreover, in some cases, the method 600 can also include sending image data (e.g., the first image, the second image, an image generated based on the first and second images, image data including at least a portion of the first and/or second image, etc.) to one or more computing devices such as, for example, a computing system (e.g., 110), a storage (e.g., 205), a server, a mobile device, a processor, etc.

For example, in some cases, the method 600 can also include sending, to a computing system (110) configured to control one or more operations of an autonomous vehicle (102), image data including at least a portion of the first image (e.g., 510A) and/or the second image (e.g., 510B); detecting, via the computing system (110) on the autonomous vehicle (102), features in the image data; and generating, via the computing system (110) on the autonomous vehicle (102), navigation instructions based at least partly on the features detected in the image data.

The features detected in the image data can include environment conditions captured in the image data such as, for example and without limitation, a light or light color, an object (e.g., a sign, street/road obstruction, etc.), an animal, a human (e.g., a person crossing a street, a person on a sidewalk, a person on a bicycle, etc.), a traffic signal (e.g., a traffic light signal, a traffic sign signal, a roadside display signal, a break light on a vehicle, a turn signal on a vehicle, etc.), a landscape (e.g., a building, a sidewalk, a hill, a wall, a tree, a pothole, a traffic rail or guard, a dead end, etc.), another vehicle, weather conditions, scene characteristics, etc.

In some examples, the first set of photodiodes (314) and the second set of photodiodes (316) can be contained in a substrate layer (408) on the image sensor (106A). Moreover, in some examples, the image sensor (106A) can include a wiring layer (406). In some cases, the wiring layer (406) can include one or more transistors and one or more wires connected to the one or more transistors. Moreover, in some cases, the wiring layer 406 can include one or more conductive layers such as, for example and without limitation, a metal and/or polysilicon layer.

As described herein, one aspect of the present technology includes gathering and using data available from various sources to improve quality and experience. The present disclosure contemplates that in some instances, this gathered data may include personal information. The present disclosure contemplates that the entities involved with such personal information respect and value privacy policies and practices.

Figure 7:
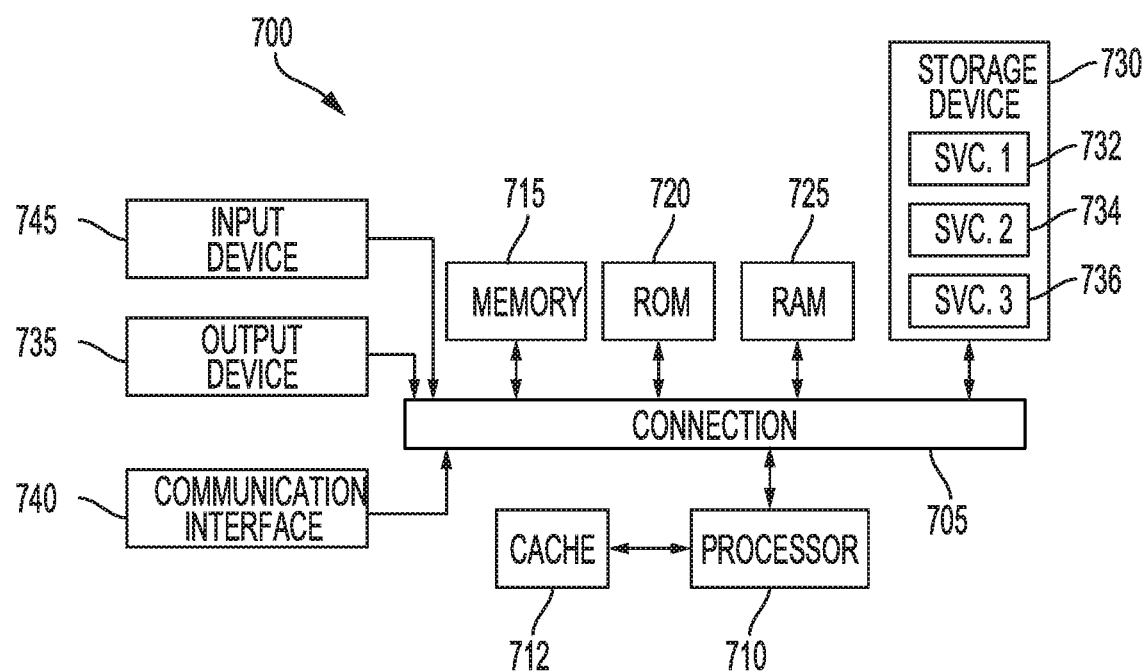
FIG. 7 illustrates an example computing system architecture for implementing various aspects of the present technology.

FIG. 7 illustrates an example computing system architecture 700 which can be implemented by, for example, any computing device making up internal computing system 110, remote computing system 150, computing device 170, image processing system 200, or any other computing device. In FIG. 7, the components of the computing system architecture 700 are in communication with each other using connection 705. Connection 705 can be a physical connection via a bus, or a direct connection into processor 710, such as in a chipset architecture. Connection 705 can also be a virtual connection, networked connection, or logical connection.

In some implementations, computing system architecture 700 is a distributed system in which the functions described in this disclosure can be distributed within a datacenter, multiple data centers, a peer network, etc. In some implementations, one or more of the described system components represents many such components each performing some or all of the function for which the component is described. In some implementations, the components can be physical or virtual devices.

The computing system architecture 700 can include at least one processing unit (CPU or processor) 710 and connection 705 that couples various system components including system memory 715, such as read-only memory (ROM) 720 and random access memory (RAM) 725 to processor 710. Computing system architecture 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system architecture 700 includes an input device 745, which can represent any number of input mechanisms, such as a microphone for speech, a touch-sensitive screen for gesture or graphical input, keyboard, mouse, motion input, speech, etc. Computing system architecture 700 can also include output device 735, which can be one or more of a number of output mechanisms known to those of skill in the art. In some instances, multimodal systems can enable a user to provide multiple types of input/output to communicate with computing system architecture 700. Computing system architecture 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some implementations, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some implementations, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. An image sensor comprising:
   a first color filter array (CFA) covering a first set of photodiodes to enhance low light sensitivity, wherein the first CFA comprises a first set of color filters;
   a second CFA covering a second set of photodiodes to enhance color separation, wherein the second CFA comprises a second set of color filters that is different from the first set of color filters;
   a substrate layer disposed under the first CFA and the second CFA, wherein the substrate layer contains the first set of photodiodes and the second set of photodiodes;
   a wiring layer disposed under the substrate layer; and
   one or more processors configured to:
      generate, by the first set of photodiodes, a first image based on a first interpolation determining a specific color channel based on a mean of color channel values of a plurality of neighboring color channels in the first image;
      generate, by the second set of photodiodes, a second image based on a second interpolation determining color channel values based on edge-aware interpolation; and
      generate an output image based on the first image and the second image based on a combination of the second interpolation and the first interpolation.

2. The image sensor of claim 1, further comprising one or more lenses covering the first CFA and the second CFA.

3. The image sensor of claim 1, further comprising a high dynamic range (HDR) camera, wherein the image sensor comprises an HDR image sensor in the HDR camera.

4. The image sensor of claim 1, wherein the first set of photodiodes is configured to receive light filtered by the first CFA covering the first set of photodiodes and generate a first image signal that is based on the light filtered by the first CFA, and wherein the second set of photodiodes is configured to receive light filtered by the second CFA covering the second set of photodiodes and generate a second image signal that is based on the light filtered by the second CFA.

5. The image sensor of claim 4, further comprising one or more processors configured to: receive the first image signal generated by the first set of photodiodes; receive the second image signal generated by the second set of photodiodes; generate a first image based on a first interpolation of color information in the first image signal; and generate a second image based on a second interpolation of color information in the second image signal.

6. The image sensor of claim 5, wherein the one or more processors are further configured to process the first image and the second image through at least a portion of an image signal processing pipeline.

7. The image sensor of claim 6, wherein the image signal processing pipeline comprises one or more image processing operations, the one or more image processing operations comprising at least one of a denoising operation, a downsampling operation, a color transform, a tone reproduction operation, an image scaling operation, an image enhancement operation, a color space conversion operation, and a compression operation.

8. The image sensor of claim 6, wherein the image sensor is positioned in a camera system on an autonomous vehicle, the camera system comprising the image sensor and the one or more processors, wherein the one or more processors are further configured to send image data to a computing system on the autonomous vehicle, the image data being based on at least one of the first image and the second image, and wherein the computing system is configured to detect features in the image data and generate navigation instructions based at least partly on the features detected in the image data.

9. A method comprising:
   receiving, by a first set of photodiodes in an image sensor, light filtered by a first color filter array (CFA) covering the first set of photodiodes, wherein the first CFA enhances low light sensitivity, wherein the first CFA comprises a first set of color filters;
   receiving, by a second set of photodiodes in the image sensor, light filtered by a second CFA covering the second set of photodiodes, wherein the second CFA comprises a second set of color filters that is different from the first set of color filters;
   receiving the light at a substrate layer disposed under the first CFA and the second CFA, wherein the substrate layer contains the first set of photodiodes and the second set of photodiodes and a wiring layer is disposed under the substrate layer; and
   generating, by the first set of photodiodes, a first image based on a first interpolation determining a specific color channel based on a mean of color channel values of a plurality of neighboring color channels in the first image;
   generating, by the second set of photodiodes, a second image based on a second interpolation determining color channel values based on edge-aware interpolation; and generating an output image based on the first image and the second image based on a combination of the second interpolation and the first interpolation.

10. The method of claim 9, wherein each of the first set of photodiodes is larger than each of the second set of photodiodes, and wherein the image sensor comprises a high dynamic range (HDR) image sensor.

11. The method of claim 9, further comprising: processing the first image and the second image through at least a portion of an image signal processing pipeline.

12. The method of claim 11, wherein the image signal processing pipeline comprises one or more image processing operations, the one or more image processing operations comprising at least one of a denoising operation, a downsampling operation, a color transform, a tone reproduction operation, an image scaling operation, an image enhancement operation, a color space conversion operation, and a compression operation.

13. The method of claim 9, further comprising:
sending, to a computing system configured to control one or more operations of an autonomous vehicle, image data comprising at least a portion of the first image and the second image;
detecting, via the computing system on the autonomous vehicle, features in the image data; and
generating, via the computing system on the autonomous vehicle, navigation instructions based at least partly on the features detected in the image data.

14. An autonomous vehicle comprising: an image sensor comprising: a first color filter array (CFA) covering a first set of photodiodes to enhance low light sensitivity;
a second CFA covering a second set of photodiodes to enhance color separation, wherein the second CFA comprises a second set of color filters that is different from the first set of color filters, wherein the first CFA comprises a first set of color filters;
a substrate layer disposed under the first CFA and the second CFA, wherein the substrate layer contains the first set of photodiodes and the second set of photodiodes; a wiring layer disposed under the substrate layer; and
one or more processors configured to:
generate, by the first set of photodiodes, a first image based on a first interpolation determining a specific color channel based on a mean of color channel values of a plurality of neighboring color channels in the first image;
generate, by the second set of photodiodes, a second image based on a second interpolation determining color channel values based on edge-aware interpolation; and
generate an output image based on the first image and the second image based on a combination of the second interpolation and the first interpolation.

15. The autonomous vehicle of claim 14, wherein the image sensor comprises one or more lenses covering the first CFA and the second CFA.

16. The autonomous vehicle of claim 14, further comprising a high dynamic range (HDR) camera, wherein the image sensor comprises an HDR image sensor in the HDR camera.

17. The autonomous vehicle of claim 14, wherein the first set of photodiodes is configured to receive light filtered by the first CFA covering the first set of photodiodes and generate a first image signal that is based on the light filtered by the first CFA, and wherein the second set of photodiodes is configured to receive light filtered by the second CFA covering the second set of photodiodes and generate a second image signal that is based on the light filtered by the second CFA.

18. The autonomous vehicle of claim 17, wherein the one or more processors are further configured to:
receive the first image signal generated by the first set of photodiodes;
receive the second image signal generated by the second set of photodiodes;
generate a first image based on a first interpolation of color information in the first image signal; and
generate a second image based on a second interpolation of color information in the second image signal.

19. The autonomous vehicle of claim 18, wherein the output image generated by the image sensor comprises at least a portion of the first image and the second image, and wherein the one or more processors are further configured to process the first image and the second image through at least a portion of an image signal processing pipeline, the image signal processing pipeline comprising at least one of a denoising operation, a downsampling operation, a color transform, a tone reproduction operation, an image scaling operation, an image enhancement operation, a color space conversion operation, and a compression operation.

20. The autonomous vehicle of claim 14, wherein at least one of the one or more processors comprises an internal computing system configured to control one or more operations of the autonomous vehicle, and wherein each of the first set of photodiodes is larger than each of the second set of photodiodes.

* * * * *